(12) United States Patent
Pace

(10) Patent No.: X9168
(45) Date of Patent: Oct. 14, 1835

(54) SPRINGS, CARRIAGE

(76) Inventor: Henry Sr. Pace

Henry Pace Senr. Cincinnati Ohio.
Letters Patent.

The Schedule referred to in these Letters Patent, and making part of the same, containing a description in the words of the said Henry Pace Senr. himself of his improvement in the springs of Vehicles.

To whom all these presents shall come.

Be it known that I Henry Pace Senr. of Cincinnati, of the County of Hamilton and State of Ohio, have invented a new and useful improvement in the mode of affixing and hanging carriage bodies and beds to every description of carriages that may be drawn by horse or other animal powers, or by steam or other power, such as stages or mail coaches and coaches of all kinds, waggons of all kinds barouches, gigs, chaises, chairs, sulkies, caravans, cars, carts, and all kinds of wheel carriages or vehicles whether for pleasure or other purposes by the application of levers of the denomination of the lever power of the first kind, to multiply the required spring or other power that may be applicable to the suspension of carriage bodies, or the beds to carriages and which have not hitherto been used or known to be applied to such purposes and that the full and exact description of the essential parts in my in my improved mode of suspending and hanging bodies to carriages with levers of the denomination of "the lever power of the first kind, to multiply the required spring or other power that may be applicable to the suspension of carriage bodies, and which levers have not hitherto been used or known to be applied to such purposes, and for which I claim to be the first inventor as follows. Firstly. To attach as many props and levers of the denomination of the lever power of the first kind as may be required for the use of any vehicle or carriage drawn or propelled by animal, steam or other power, one prop for each lever may be fixed on any part of the running gear of the carriage that may suit its use or form The the levers to work free, the fulcrum to be placed at any part of the lever
between the weight and the power, at the option of the builder,
Secondly. To attach one or more springs or other applicable power, to
each lever, one end of each spring or springs to be affixed either to the
bottom of the body or bed, or to the running gear, and the other end of
each spring or springs or other power, to be attached to the end of the
long arms of the lever so as to work free; or to the running gear, Thirdly. To attach the ends of the short arms of all the levers to the body
shackles, or to the body or carriage bed (which is the weight) so that the levers
and springs may work free when the carriage is in motion. In forming my
improved mode of hanging carriage bodies to the running gear of carriages
with levers of the denomination of the first kind, I employ these my-
essential points according to convenience, which admits of various
modifications as to form and proportions such as must be and are
quite familiar to every competent carriage manufacturer and there-
fore it will be sufficient for the perfect description of my improved
principle of hanging carriage bodies to the running gear of carriages with
the levers of the first kind, that I explain some of the modes of forming
and combining the essential points of my invention with the other parts
of the variety of carriages and of fashions and modes which may be
familiar in the work shops. Mode 1. Four wheel carriages. Levers to
project under the body - Flat springs, either lineal, eliptic or otherwise
affixed to the body at each end of the bottom. Suppose a carriage to admit
of levers from two or up to twelve feet in length, more or less, but say for ex-
ample that it shall be five feet. Place the fulcrum at the option of the
manufacturer, which may be one sixth of the length of the lever; this
gives the short arm ten inches in length, the long arm four feet two
inches. Then fix two props in the place of jacks or springs on the back
of the carriage on the axle bed and spring bar. and two props on the
front of the carriage in the same way, but the front props and levers must
stand in a line of two or three inches (more or less as required) from
the side of the body and towards the perch to give room for the levers to
work side by side & to give room for the ends of the long arms of the
Levers levers to pass each other without striking. Each prop is to have a
mortice in its top, to admit a lever on each. The lever to be secured at
its fulcrum in the mortice on its prop by a bolt through the sides of the
mortice and the lever; The long arms of the levers to slope under the body
of the carriage. The long arms of the back levers, to point towards the front and
the front levers to point towards the back of the carriage to meet the springs
of perhaps twenty inches long more or less. one end of each spring is affixed
to the bottom of the body next to the shackle, one spring or more are requi-
red to each lever. The end of the long arms of the levers will pass each other. The springs at
at the fore part of the carriage to be bolted on at the corner of the body in the
usual place for the shackles. The two back springs to be bolted in the
bottom of the body two or three inches from the sides at the corners so
that the levers may pass each other without striking. A single or double
lineal spring or more added together or an eliptic, to apply to each lever, one
end of each spring or springs to each lever thus bolted on to the bottom of
the body is sloped down for its other end to be about five or six inches
below the bottom of the body sufficient to give play for the lever and
spring to work up and down without striking the bottom of the body.
The end of the long arm of each lever to meet the end of each spring in a
line under the spring to be attached to it by an oblong square link to work
free. The link attaches the spring and lever together and may be two or
three inches long as required for the levers to move in the arks of their
circles by the combined movement of the spring the lever and the link.
If the weight is much the spring above described may have a lineal or
spring of short dimensions rivited on to its end similar to that on the
key to a bolt. This small spring to slope its other end to bear against
the bottom of the body at which place a plate of brass will prevent to
wear. The short arm of each lever to be attached to the body by knob hinge
or otherwise to the shackles, to work free. If the front wheels of the carriage
are intended to turn under the body, then all the props the levers the springs
and the shackles (or other attachments in lieu of shackles) are placed
nearer or near ~~xx~~ ~~near~~ to the perch as may be required to remove the levers
from contact with the wheels; These levers are also calculated to
have have the thick end of the flat spring or springs affixed and riveted
on to the end of the long arm of each lever (in lieu of fixing the spring
to the body) so that the other end of the spring shall reach near to the
axle bed to which it may be attached by means of a staple and an
oblong square link. If the levers are made of iron part of the long arm
of each may be made of steel to spring towards the end, and the end of
the spring to be attached to the bolster as above; or the spring may be
riveted on the lever. The spring may be much longer than when attached
to the body, and made more springy. If the lever is made of wood the
same principle can be continued with mode VII. and mode VII. will so
answer well to combine with this mode I. [see mode VII].
The end of a lever (one foot long) recedes in its ascent or descent of six
inches, nearly one and a half inch from a perpendicular line by the
motion of the lever in the arc of its circle; one of two feet recedes 7/8ths
of an inch in the ascention of six inches one of three feet ascends nine
sixteenths of an inch, one of four feet seven sixteenths, one of five feet
one third of an inch. as the short arm of the lever, will have but little rise
and fall the play of the gearing when in motion may answer to the motion of
the lever in the arc of its circle; or a mortise of an inch more or less as required
can be made in each of the front levers in lieu of the hole for the bolt at the
fulcrum by which the front levers will slide backwards and forwards to
the motion of the short arms in the arcs of their circles. The long arms are allowed
for their motions in their arcs of circles by an extra length of link which attach-
es each to its respective spring. The patentee might here have rested his right
to hang carriage bodies with levers of the first kind, but he has added the
following variety of modes in this new application of the principles
a principle which is so well calculated to amalgamate with the spirit and
knowledge of the times, and with the progressive increase of the most fan-
ciful and brilliant embellishments.
Mode II. Four wheel carriages with levers to project under the body - Flat or
springs affixed to the running geer. The props levers and shackles to be
affixed or attached agreeably to the mode and principle described in
mode I. with the following variations viz. Six or eliptic or lineal
spring spring on and acrofs the midway of the length of the Perch. Fix another
directly under the perch and acrofs it with the horns or points of the
springs to horn up (or down) the same as the upper one if Eliptic. Place
a bolt through the top of the perch and the two Elipties in their centres
to hold both fast. the two Elipties will then form half elipties on
each side of the perch and are prepared to connect with the ends of the
two long arms of the two back levers. Fix two more elipties in some
manner acrofs the perch, side by side with the first, two for the two
front levers; they are then prepared to be attached to the two long
arms of the first levers by links as described in Model. with this
difference that this lever, (with the springs affixed to the running geer
will work over the springs to which they are attached; and also the
levers are shorter and do not pafs each other as in model. but reach
only to to the springs at the midway of the perch. also the levers
and props are affixed at the four corners of the running geer; as
also all the shackles to the four corners of the body. If the front or
wheels are to turn under the body the hind levers and props may re-
main as they are, but the front props and levers are to be placed triangularly
that is, the ends of the short arms of the front levers are at their appro-
priate shackles at the corner of the body and the ends of the long arms
to go near and point to the side of the perch; but the props and shac-
kles are to be fixed in a line to the levers. the springs if flat to be
affixed on the perch, in a line with the levers to be attached to them
as before; or a spiral spring can be attached to the perch one or more
on each side. or if this shall not combine with the form or fashion
of the carriage, then the front levers with their props and shackles
may be placed nearer or near to the perch. in this case a short barr my
be fixed acrofs and under the perch to which it is to be bolted about one
foot from the axletree or rather at a proper distance from the hounds
or horn bar to prevent their colision. A lineal or other spring or springs
are then affixed to one ends of the crofs bar, the same to the other ends
and each spring or springs if flat to project in a line with and
under their respective levers to the end of the front long arms
or in or in lieu of a bar the springs may be affixed at their thick ends
to the axle bed or any part of the front gearing that may be applic-
cable, but then the springs will have to be as long as the long arms of
the front levers to extend in a line under them to be united to their
ends but it is to be considered whether the weight be carried (if it
is great) will not force the axle bed on the bottom end of the springs from
their fixtures. — Mode III.— Four wheel carriages with levers to
project under the body— Spiral springs attached to the running gear
Bolt two bars across and under the perch at midway of its length
side by side of each other, The spiral springs to be attached by the middle
to the four ends of the two bars and to stand upright with their
mid lengths one half below the bar, the other above to give space
for the play of the levers. The ends of the bars to be made to line with
the ends of the long arms of the levers. one or more springs may be
attached to each end of the two bars (or 4 arms) in a position to
work to the levers; The ends of the long arms of the levers to reach
to the spring to which they are to be attached as in mode II. If the
front wheels are to turn under the body pursue the described
mode of II. by shortening the front bar which contains the front
spiral springs. The spiral springs may be made enclosed with
caps and posts for props, in lieu of a cylinder which is apt
to clog with the dust of the roads; The spring is worked by a piston
introduced down its middle with a cap fixed to the bottom end
of the piston and a ring at the upper end. The ring to be attached
to the end of the long arm of the lever to work free.
Mode IV— Four wheel carriages— Upright Levers— Spiral springs at-
tached to the running gear. Six props on the axle beds one at each corner
of the carriage. Each prop to be formed by fixing two posts set sufficient-
ly apart to admit the lever to be placed between them. The props
may be twenty eight inches long more or less as the carriage
may admit, The levers thirty two more or less. The levers to be pla-
ced upright to work backwards and forwards between the posts
or props, and suspended by a bolt placed through the sides of
the the posts or prop and the lever at its fulcrum. The props to [illegible]
or two inches from an upright position and leaning from the
body so as to admit the levers to stand upright or in any other way
to work correct. The ends of the long arms of the back levers to extend
down three inches (or as may suit) below the running gear and
between the axletree, and spring and [illegible] bars so as to be attached
to the pistons in the spiral springs. The front levers in the same way
but must be in a mode consonant to the gearing of the hounds the
horn work, and the bolster, or axle. The spiral spring is attached
to an arm fixed to the spring bar, and axle underneath and hori=
zontal under the carriage in a line with the Perch. The ring at the
top of the piston to the spiral spring is to be two or three inches from
the end of its respective lever. A mortice must be made in the arm
to which the spring is attached at that part of it which extends between
the spring bar and the axletree to admit the end of the lever to pass
down through the mortise to be attached to the piston in the spring
to work free. The short arms of the levers to be attached to the
body shackles by a buckle and leather strap as usual. The spiral
spring made as described in mode III. this mode cannot inter=
fere with the wheels. --- Mode V. Four wheels carriages with
upright Levers. Flat springs affixed to the running gear.. Fix an
elliptic spring on its edge on or underneath and across the perch,
near or close, to the axletree or bed as may suit. confine the spring
at its centre with a staple to go over and across the spring and
through the perch. The horns of the eliptic spring may bend either
from or towards the levers at the back of the carriage to be at=
tached by link or chain to the ends of the long arms of their re=
spective levers as before. The same with the front levers & springs
with this difference that the spring at the front may have to be
fastened on the perch at a distance from the axletree sufficient
to clear the hounds or horn work if required and to have a
chain attached to the lever and spring. Mode VI. Horizontal
Levers may work across the front and back of the body and carriage
gear geer, with either spiral or flat springs.- In this mode the two
upright levers and the two props at the front of the carriage, and
the two at the back are to be placed for the levers to lay and work
across the carriage. The Body shackles to be affixed to extend
out on the sides of the body and across the running-geer, at the four cor=
ners of the body so as to meet the ends of the short arms of the four
levers, which also extend out from their props beyond the sides of
the body. A leather strap and buckle may attach the end of the short
arm to the shackle; as also a leather strap to be attached to the ends of
the long arms of the levers (one to each) and to the running geer, to hold
the lever from working sideways as the weight in the body will pull
the lever sideways by bearing on the short arms. This mode will
not suit but very occasionally but it allows of more length of lever
than to the upright one. The spiral springs to stand upright and
attached ~~the~~ outside the off and near nutting bars that are fixed
between the axle and spring bar, in a direction under the ends
of the long arms of their respective levers. The flat springs to
lay horizontal on the top and across the geering at the back and at
the front of the body. to work to their levers, or the props with
their levers may be turned about half a quarter round towards the
middle of the axle and moved more to the middle, so that the
ends of the short arms shall bear directly under each corner of
the body and the long arms to cross each other. The springs affixed
horizontally under the axles. Mode VII. Sloping levers with
their props, springs and shackles may be made of wood. to carri-
ages of the denomination of one horse Yankey waggons or other
appropriate vehicles. affix four (more or less as required) wooden
props and levers as before described in mode I. Bore an augur
hole of an inch diameter or more through the bolster or axletree
to admit the foot of each prop; or if the hole shale weaken the
bolster fix a staple horizontally through the bolster on the inside
under the body to admit the foot of the prop. The prop to have
a shoulder to rest on the bolster; The short arm of the levers
to be to be attached to the body by wooden hingework so as to work
free: The Levers to run the whole length of the perch, between the front
and back axles. The thick ends of the springs to be bolted on to the
bottom of the body at its front (the same same behind) immediately
over their respective levers. A bolt to go through both shackle
and spring together, to attach them to the body, and the other end
of the spring to extend with the whole length of the lever, and both
lever and spring to be attached together by an oblong link, the lever
to work under the spring, and both to work free. With some exceptions
this is applied agreeably to Mode I. The ends of the levers & springs
may in some cases require rivets as may also the bolster through
the foot of each prop. The parts of friction may be plated with
iron and brass or steel. The levers, props, and shackles may be
placed as in Mode I. for the front wheels to turn under the body.
Sufficient has been shown of the principle of attaching the dif=
ferent kinds of levers and springs to form wheel carriages
to enable the manufacturer to vary the mode to suit all kinds of
carriages whether constructed with two or more wheels. Two
wheel gigs, chairs, chaises, sulkies and other vehicles may
have their bodies suspended by laying the levers either
length ways or across the running geer as may best suit by
fixing two props on the axle or by any mode of geering and by
fixing slip-stays, on the ends of the short arms of the levers,
and to the body. A sulky may be suspended by one lever and
spring in this way. a caravan or long bodied wagon or coach
with heavy burthen may have three or four levers at each end
and also a bar fixed on and across the Perch at its midway between
the hind and fore wheels to sustain props and levers to work on
across the geering.— Most workmen understand that the levers
must be proportionate to the strength required in the short arm
and at and about the fulcrum and to be made proportionately
thence to the end of the long arm, for if a spring or power of [illegible]
lbs. is attached at the end of the long arm it requires more
strength strength at that end than will support the 450 lbs. but if the short arm is
five times shorter than the long one the short arm will have to support
2250 lbs. Thus the four Levers with springs or other power of 450. lbs. to
each Lever will bear on the ends of their short arms. four tons and a half
The flat springs to be thicker and stronger at the ends which are bolted
on. The spiral springs must not be made to draw more 150 lbs each, three
of which attached to each lever (one lever at each corner) will bear a
weight of 10,800 lbs of the short arms of the levers are one seventh of
the whole length. if the lading or weight is 8100 lbs. there will remain
a spring power of 2.700 lbs. to act against jolts on the roads. Again the
lever with short arm, one fifth of its length with a spring to draw 300.
lbs. gives 1200 lbs power to each Lever, or 4.800 lbs to the four. If then,
weight is 3.200 lbs, there remains 1600 lbs. to act against jolts on the
roads. or a lever with short arm one fourth of the length of the lever
spring to draw 200 lbs gives the four Levers 2.400 lbs power. thus the
weight 1600 lbs leaves 800 lbs. It may be necessary to notice for
heavy lading the manufacturer need not be very fastidious whether
he makes the short arm of the lever (more especially if it is a
long lever) one fifth or one seventh of the whole length (more or less)
as it is proved that a very small movement in the rise and fall
when in a continued springing motion will save both the bag=
gage and waggon from the solid force of jolts on the roads to sup=
port the shocks of which the manufacturer is necessitated to build
carriages very ponderous when without springs.
The props, levers, springs, shackles &c, may be made of any suitable
material, but it is proper where the value of the carriage will afford
it, to make the springs (particularly the spiral which are consider
=ed to be advantageous) of good English sheer steel manufactured by
the best workmen in that art. The levers and springs may be made
of figured or other ornimental castings either in brass or other
varieties of beautiful mixed metals where ornament and but
little strength are required... P. S. four steel springs of three
pounds weight each, and twenty inches long; two broad at the
bolt bolt hole at one end (by which each spring is bolted to the bottom of the carriage body) and the breadth decreased to one inch two eighths and a half broad at the other end; the spring made bowed and ~~[illegible]~~ fixed on the bottom of the carriage body in a slope downwards so that the bow turns upwards (like the lower section of the Eliptic spring with its end or point, at the distance of seven inches from the bottom of the carriage body as described in Model 2. will draw more than 160 lbs with ease, which if the lever is forty inches long the short arm eight the spring will bear up five times 160 lbs; The experience of the patentee leads him to beleive that this kind of a spring is the best, for when the spring bends with the bow it is not liable to break as when the springs motion is opposed to the bent of the spring as is the case with the Eliptic springs now in common use. Thus the four springs bear up 3.200 lbs.

Exd

Witnesses

Chas. M. Keller
H. Keller

Henry Pace Senr. [L.S.]

5085 Words]